United States Patent Office 3,201,398
Patented Aug. 17, 1965

3,201,398
PREPARATION OF 7-HALO-1,2,3,4-TETRAHYDRO-
4-OXO-6-QUINAZOLINESULFONAMIDE
Herbert G. Arlt, Jr., Ridgefield, Conn., and Gilmer T. Fitchett, Green Brook Township, Somerset County, and Francis X. Markley, Piscataway Township, Middlesex County, N.J., assignors to American Cyanamid Company, Stamford, Conn., a corporation of Maine
No Drawing. Filed Aug. 3, 1962, Ser. No. 214,537
2 Claims. (Cl. 260—256.5)

The present invention is concerned with a novel procedure for the synthesis of sulfonamides of the type

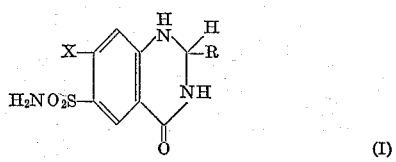

(I)

wherein "X" is a halogen selected from chlorine and bromine and "R" is a lower alkyl of from one to four carbon atoms. In particular, the invention is concerned with a simple, direct multistep method for the direct production of the desired sulfonamide from a corresponding 2-amino-4-halo-benzamide.

Such sulfonamides are known compounds of established utility which in the past have been successfully produced, but by more complex synthesis routes. This is well illustrated, for example, in U.S. Patent No. 2,976,289. The latter also represents perhaps the best previously-available method for production of the sulfonamide products of (I), supra.

In general, the overall procedure of the present invention may be described quite simply as involving the following operational steps.

Step I.—Conversion of the substituted benzamide to the corresponding substituted quinazolinone.
Step II.—Chlorosulfonation of the quinazolinone.
Step III.—Recovery of the chlorosulfonylquinazolinone.
Step IV.—Conversion of the chlorosulfonyl derivative to the product sulfonamide.

As so stated, however, the simplicity of the procedure is perhaps more seeming than real, particularly as to Steps II–IV, inclusive. Accordingly, each step will be discussed separately.

While not sequentially the first step, such a discussion is most readily initiated by a discussion of the second operation. Accordingly, the chlorosulfonation step will be noted first.

STEP II.—CHLOROSULFONATION

Typical chlorosulfonation products with which the present invention is concerned are produced in accordance with the following reaction (A):

(A) 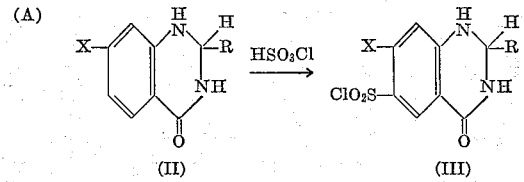

wherein "X" and "R" have the values indicated above for Formula I. Quinazolinones of (II) are converted thereby to the 2-alkyl-7-halo-1,2,3,4-tetrahydro-4-oxo-quinazoline-sulfonyl chloride of (III).

Typical illustrative quinazolinones of (II) which may be chlorosulfonated in accordance with the process of this invention include 7-chloro-2-methyl-2,3-dihydro-4 (1H)-quinazolinone, 7-chloro-2-ethyl-2,3-dihydro-4(1H)-quinazolinone, 7-chloro-2-n-butyl-2,3-dihydro-4(1H)-quinazolinone, 7-bromo-2-methyl-2,3-dihydro-4(1H)-quinazolinone, 7-bromo-2-n-propyl-2,3-dihydro-4(1H)-quinazolinone, 7-fluoro-2-ethyl-2,3-dihydro-4(1H)-quinazolinone and the like.

Since the quinazolinone of (II) in which "R" is ethyl and "X" is chlorine is a typical starting material, herein, it will be taken as illustrative for purposes of this discussion, as will be also the chlorosulfonated quinazolinone of (III). For purposes of simplification, these illustrative materials will be referred to by the symbols "QEC" and "QECS," respectively.

Unfortunately, as shown in the copending application of one of us, Serial No. 214,487, filed August 3, 1962; when an attempt is made to carry out reaction (A) to convert a compound of (II) such as QEC, into a compound of (III) such as QECS; the yield of 6-chlorosulfonyl product is generally too low to be wholly satisfactory for commercial development. However, as also shown therein, when Reaction (A) is modified by the use of a suitable activator such as $PCl_5$ or $SOCl_2$, this yield can be readily increased to 200% or more of that previously obtainable.

However, as thus stated, again simplicity of the invention is more apparent than real. Merely providing in the reaction medium an activator of the present invention will not produce the desired result. As will be amplified below, not only must the activator be provided, but several controls must first be established within limited ranges in setting up the reaction medium. Thereafter, the QEC, as illustrative of (I), must be added under controlled conditions and control must be maintained until reaction is substantially completed.

Among the various controls which must be observed, perhaps the most important are (a) the proportions of QEC to chlorosulfonic acid, both initially and throughout the reaction; (b) the proportions of QEC to activator; and (c) the reaction temperature ranges, both initially and during the reaction.

As to (a), the QEC:chlorosulfonic acid ratio; for each one mol of quinazolinone, there must be provided a total of between three and about eight mols, preferably from about four to about six mols, of chlorosulfonic acid. As to (b), the QEC:activator ratio; for each one mol of quinazolinone, between about 0.75 and about four mols, preferably from about one to about two mols, of the phosphorus pentachloride or thionyl chloride activator should be present.

As to the temperature control, a typical chlorosulfonation reaction is carried out by combining the correct amounts of chlorosulfonic acid and the activator into a reaction medium at an initial temperature between about zero and about 25° C., preferably from about 10° to about 20° C. External cooling will be found necessary. A good agitation system should be started and maintained in operation throughout this and the subsequent steps. To the agitated medium, the illustrative QEC must be slowly added. Resultant reaction is exothermic and again external cooling is necessary. The rate of QEC addition will depend on the size of the reaction mass and the efficiency of the cooling and agitating systems. It must be such that the reaction mass temperature is maintained at from about 10° to not over about 30° C. A preferable range is from about 15° to about 25° C.

Once the total QEC to be fed has been added, agitation and temperature control should be continued until the reaction rate becomes too slow to be economically feasible. It is readily understood that this will depend on the particular installation. Usually some three to six hours will be found to constitute a good practice.

As will be seen from the foregoing description, each of the critical controls may be varied within certain limits. However, each is critical and all must be maintained with these specific limits. If such precautions and controls are not maintained, the desired optimum yields will not be obtained.

Once reaction has been accomplished to the desired degree, the product is recovered. In general, the mechanical steps in this recovery may be conventional and are not part of this invention. One convenient practice is to dilute the reaction mass by pouring it into a mixture of ice and water. QECS, or another corresponding product of (II), may be conventionally extracted with a suitable, substantially water-immiscible solvent such as isopropyl acetate, sec.-butyl acetate, and the like.

STEP I.—QUINAZOLINONE FORMATION

Having shown in the foregoing discussion of Step II the nature of the quinazolinone materials such as QEC of (II), it may be well at this point to indicate their method of formulation. This step is included in this discussion to illustrate the overall synthesis. It is not, however, new with the present invention and per se is not so claimed.

Suitable quinazolinones of Formula II may be readily prepared by reacting the corresponding 4-halo-2-aminobenzamide with an aliphatic aldehyde in the presence of toluenesulfonic acid. The aldehyde should contain one more carbon than the desired 2-alkyl substituent. For example, when the aliphatic aldehyde is propionaldehyde, the product is 7-halo-2-ethyl-2,3-dihydro-4(1H)-quinazolinone. Such a product, when the 7-halo substituent is chlorine, is the illustrative QEC of the present discussion.

STEP III.—QECS RECOVERY

As discussed above in conjunction with Step II, the reaction mixture after completion of Reaction (A) is treated to collect the chlorosulfonyl product. As there noted, the reaction mixture is diluted with ice and water. The chlorosulfonyl product is extracted from the resultant slurry with a suitable water-insoluble lower alkyl ester of a lower alkanoic acid. Illustrative esters include, for example, isopropyl- and sec.-butyl acetate.

However, solvent extraction in such cases becomes progressively less satisfactory as the interval increases between the time of dilution and the completion of extraction. Surprisingly, this difficulty can be overcome by combining with each hundred parts by weight of the water-insoluble ester some twenty to one hundred parts by weight of a water-soluble ketone, such as acetone, methyl ethyl ketone or diethyl ketone. This improved solvent extraction procedure forms a part of the subject matter of copending application, Serial No. 214,538, now U.S. Patent 3,154,550 filed August 3, 1962, by one of the present inventors.

Use of this improved extraction medium is not claimed per se as part of the present invention. In the instant application other solvents or solvent mixtures may be utilized if necessary or desirable. However, since the next step in the present process normally is carried out in the solvent extract without prior isolation of the QECS, or its equivalent, the solvent should be one which is capable of dissolving ammonia but remaining inert with respect thereto.

STEP IV.—SULFONAMIDE FORMATION

A particular feature of the present invention is the conversion of QECS, or its equivalent, to the sulfonamide product. In general, this is quite readily accomplished. The QECS-containing solvent extract produced in Step III is directly treated with ammonia. Prior isolation or purification of the QECS is not required.

Of course, if necessary or desirable, the QECS can be isolated and then redissolved in an additional quantity of the same or different solvent. This will be seldom encountered except where the solvent medium used in Step III is for some reason incompatible with the use of ammonia in Step IV. In such cases it will be necessary to redissolve the QECS in an ammonia-compatible solvent.

The QECS solution is held at a suitable temperature, usually some minus ten to about twenty-five degrees centigrade, and treated with ammonia until no further precipitation is noticeable. Thereafter, the slurry is agitated and the product is redissolved by addition of an aqueous alkali metal hydroxide solution, added in sufficient amount. In general, this can be accomplished conveniently by adding water in amount of about one-half the organic solvent volume together with about one-third the water volume of about a 50% solution of sodium hydroxide. These amounts and the caustic soda concentration may be varied as desired to produce the addition of about an equivalent amount of sodium or potassium hydroxide. It should be sufficient to form the sodium salt and provide sufficient water to ensure product dissolution.

After the product is taken up in the added water and caustic, the aqueous and organic solvent layers are allowed to separate. The sulfonamide-containing aqueous layer is collected and the product is then isolated therefrom in any desired manner, the specific method of recovery forming no essential part of the present operation.

One such method is to add to the aqueous solution sufficient Dry Ice ($CO_2$) to produce a pH of about 8.5. This will precipitate the product which may be then collected, as by filtration; then washed and dried. If so desired, the collected product also may be further purified. One useful procedure is to redissolve the solids in an aqueous alkali-metal hydroxide solution, treat the solution with activated carbon and/or diatomaceous earth or the like, and with a small amount of sodium hydrosulfite or its equivalent. The product is then reprecipitated by adding sufficient acid to produce a pH of about 4 to 5, and the precipitate can be collected, washed and dried in any desired manner.

The invention will be more fully illustrated in conjunction with the following examples which are intended for exemplary purposes only. Therein, unless otherwise noted, all parts and percentages are by weight and all temperatures are in degrees centigrade.

Example 1

To 42 parts (0.36 mol) of chlorosulfonic acid, there is added 18.8 parts (0.09 mol) of phosphorus pentachloride over a period of about 15 minutes while maintaining the temperature at 15°–20° C. 19 parts (0.09 mol) of QEC is then added over a period of about 15 minutes while maintaining the temperature at 15°–20° C., and the resultant reaction mass is agitated for an additional 6 hours at 20°–25° C. Resultant slurry is poured into a mixture of ice and water while maintaining the temperature at —5° to 0° C. The aqueous mixture is extracted with about 150 parts of isopropyl acetate, followed by a second extraction with about 50 parts of isopropyl acetate.

The extracts are combined and at a temperature between —10° and 0° C. treated with gaseous ammonia until no further precipitation of reaction product is noted. The precipitate is dissolved by agitation and addition of about 100 parts of water and about 30 parts of 50% aqueous sodium hydroxide. After allowing the mass to separate into layers, the aqueous layer is separated from the organic layer, and the sulfonamide is precipitated from the aqueous layer by adding Dry Ice ($CO_2$) until the pH is approximately 8.5. The crude product (about 20 parts) is separated, washed and dried. It assays 78.4% real (a 60.1% yield) and melts at 235°–237° C. A portion of this material is purified by dissolving in water with the aid of sodium hydroxide, treating the solution with activated carbon, Filter-Cel and a small amount of sodium hydrosulfite, and reprecipitating the product by addition of hydrochloric acid to a pH of 4.5–5.0. The melting point of purified product is 250.5–251° C. With a 96% recovery in the purification process, the overall yield based on the quinazolinone starting material is 57.6% of theory.

*Example 2*

64.3 parts (0.54 mol) of thionyl chloride is slowly added to 126 parts (1.08 mols) of chlorosulfonic acid while keeping the temperature below 20° C. 57.0 parts (0.27 mol) of QEC is added slowly over about one hour while maintaining the temperature at 15°–25° C. by external cooling. The resulting reaction mixture is then stirred for three hours at 20°–25° C. and then poured into a mixture of 200 parts of water, 75 parts of sodium chloride, 450 parts of secondary butyl acetate and 150 parts of acetone, keeping the temperature from 0° to 5° C. by internal cooling with ice and external cooling with brine. The aqueous layer is allowed to settle and is drained off and re-extracted with 150 parts of secondary butyl acetate.

The combined organic extracts are cooled to minus 5° C. and anhydrous ammonia is introduced below the surface until no further evidence of reaction is noticeable. After removal of the excess ammonia, the reaction mixture is diluted with water to a total volume equal to that occupied by about 1000 parts of water. The crude product is isolated by filtration, washed and dried. It amounted to about 38.5 parts (49.4% of theory). After further purification (by the procedure described in Example 1) the overall yield is 47.0% of theory.

*Example 3*

For purposes of comparison, 21 parts of QEC mixed with about 4 parts of sodium chloride is reacted with 70 parts of chlorosulfonic acid, collected and converted to the sulfonamide as in Example 2, except that no activator is used. The sulfonamide is collected by filtration and purified by the procedure of Example 1. The yield amounts to 7.5 parts of product, melting at 232°–235° C. and having a purity of 98%; only 26% of theory (based on the quinazolinone starting material).

Comparison of the results in Examples 1–3 illustrates the advantages of the process of this invention. Loses during purification are equal to about 4% in each case. Yields of product (M.P. 232°–235°) in Example 3 was only 26% of theory in the absence of the activator. Using thionyl chloride as the activator, this is increased to 49.4% (at comparable purity) and 47% of purified product in Example 2. Using phosphorus pentachloride, as in Example 1, the yield of crude product (M.P. 235°–237° C.) is raised to about 60% and of purified product (M.P. 250.5°–251° C.) to 57.5%. This corresponds to yields of some 189% and 230% of that obtained without the use of the activators.

A unique feature of the present invention is the high specific activity of the thionyl chloride and phosphorus pentachloride in promoting the reaction without anticipated but undesirable side reactions. This is not true of other closely related chlorides of phosphorus or oxychlorides of sulfur. The following examples are illustrative of this fact.

*Example 4*

The procedure of Example 2 is followed substituting an equimolecular amount of phosphorus trichloride for the thionyl chloride. The sulfonamide obtained is only 34.2% of theory, a yield within the order of magnitude obtained using chlorosulfonic acid without any activator.

*Example 5*

The procedure of Example 2 is followed substituting an equimolecular amount of phosphorus oxychloride for the thionyl chloride. No sulfonamide is obtained.

*Example 6*

The procedure of Example 2 is followed substituting an equimolecular amount of sulfuryl chloride for the thionyl chloride. The yield of sulfonamide amounts to only about 3.8% of theory.

*Example 7*

The procedure of Example 1 is repeated a number of times using about 200 parts of chlorosulfonic acid, about 100 parts of PCl$_5$ and about 60 parts of QEC. Yields of from about 58% to 64.2% are obtained.

We claim:
1. In the preparation of 2-alkyl-7-halo-1,2,3,4-tetrahydro-4-oxo-6-quinazolinesulfonamide wherein "halo" is selected from chlorine and bromine and "alkyl" is selected from the alkyls of 1–4 carbon atoms; the improved procedure which comprises:
   forming a reaction medium which, for about each mol of the corresponding 7-halo-2-alkyl-2,3-dihydro-4(1H)-quinazolinone as the starting material, consists essentially of
      from about three to about eight mols of chlorosulfonic acid,
      from about 0.75 to about four mols of an activator selected from
         thionyl chloride and phosphorus pentachloride;
   then at from about 10° to not over about 30° C., under agitation,
   adding thereto said quinazolinone starting material at a rate such that the exotherm does not produce a temperature rise to above about 30° C.,
   maintaining said agitation and a temperature of from about 10° to about 30° C., until reaction substantially ceases;
   diluting resultant reacted mixture with sufficient ice and water to produce a temperature of from about minus 5° to about 0° C.; then
   extracting the resultant slurry with a mixture of 100 parts by weight of a water-immiscible, lower alkyl ester of a lower alkanoic acid of about 1–3 carbon atoms with about 20 to 100 parts by weight of a water-soluble ketone of the group consisting of acetone, methyl ethyl ketone and diethyl ketone then
   at from about minus 10° to about 25° C., treating resultant extract with ammonia until precipitation of sulfonamide substantially ceases; and
   collecting resultant precipitate.
2. A process according to claim 1 in which said quinazolinone starting material is 7-chloro-2-ethyl-2,3-dihydro-4(1H)-quinazolinone.

References Cited by the Examiner

UNITED STATES PATENTS 2,910,488  10/59  Novello _____ 260—256.5

FOREIGN PATENTS 752,572  1/54  Germany.

OTHER REFERENCES

Technique of Organic Chemistry, III, Edited by Weissberger, Interscience Publishers, Inc., New York, 1950, pages 295–298, and 182.

Wagner et al., Synthetic Organic Chemistry (New York, 1953), page 822.

NICHOLAS S. RIZZO, *Primary Examiner.*

DUVAL T. McCUTCHEN, *Examiner.*